United States Patent
Angelo et al.

(10) Patent No.: US 6,952,489 B1
(45) Date of Patent: Oct. 4, 2005

(54) FINGERPRINT VERIFICATION METHOD HAVING BAND DETECTION

(75) Inventors: Michael F. Angelo, Houston, TX (US); Manuel Novoa, Houston, TX (US); Richard Churchill, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 09/675,530

(22) Filed: Sep. 29, 2000

(51) Int. Cl.[7] .......................... G06K 9/00; H04N 17/00
(52) U.S. Cl. ........................ 382/124; 348/180; 283/68; 283/78
(58) Field of Search ................................ 382/124–127, 382/115–123, 160; 283/68, 69, 78; 348/180–194

(56) References Cited

U.S. PATENT DOCUMENTS

| | | | |
|---|---|---|---|
| 4,600,675 A | * 7/1986 | Iwasa et al. | 430/111.31 |
| 4,811,414 A | * 3/1989 | Fishbine et al. | 382/272 |
| 4,827,527 A | * 5/1989 | Morita et al. | 382/127 |
| 5,065,444 A | * 11/1991 | Garber | 382/275 |
| 5,519,785 A | * 5/1996 | Hara | 382/124 |
| 5,881,182 A | * 3/1999 | Fiete et al. | 382/275 |
| 5,963,656 A | * 10/1999 | Bolle et al. | 382/124 |
| 5,978,495 A | * 11/1999 | Thomopoulos et al. | 382/124 |
| 5,987,156 A | * 11/1999 | Ackland et al. | 382/125 |
| 6,292,576 B1 | * 9/2001 | Brownlee | 382/124 |
| 6,674,902 B1 | * 1/2004 | Kondo et al. | 382/199 |

* cited by examiner

Primary Examiner—Bhavesh M. Mehta
Assistant Examiner—Aaron Carter (57) ABSTRACT

A fingerprint verification method having band detection is provided. In one embodiment, the method includes capturing a fingerprint image and processing the image to determine if it includes bands attributable to changes in illumination intensity during image capture. If such bands are detected, the method preferably aborts the creation of a fingerprint template. Otherwise, if this and other security screens are passed, the method preferably includes the creation of a fingerprint template which may be compared to a stored fingerprint template to verify user identity. If such verification is established, the user is granted access privileges. One embodiment of a system implementing this method includes a fingerprint scanner for capturing fingerprint images, and an interface card having a digital signal processor (DSP) or other suitable mechanisms including software or electronics for processing the fingerprint images and generating a fingerprint template representative of the images. The system may further include a general purpose computer coupled to the interface and configured to receive the fingerprint template. The general purpose computer can then use the fingerprint template to verify the identity of the user.

40 Claims, 4 Drawing Sheets

FINGERPRINT VERIFICATION METHOD HAVING BAND DETECTION

BACKGROUND

The present invention generally relates to a method for preventing improper authentication in biometric devices. More specifically, the invention relates to a method of detecting and preventing latent-image attacks that take advantage of weaknesses in many existing fingerprint verification schemes.

Security is an issue for many modern transactions. As the world becomes increasingly interconnected and electronic commerce becomes more commonplace, so too does the need for security. Secret identifiers such as passwords and secret personal identification numbers (PINs) have become the normal security mechanism for people conducting transactions at automated teller machines, over the telephone, or over computer networks. While secret identifiers certainly provide a measure of security, they are problematic in that they depend on users memorizing the phrase, code word, security number, etc., for access to sensitive information. This situation is worsened by the proliferation of electronic accounts and transactions which typically force users into having a multitude of secret identifiers to keep track of An attractive alternative to the use of secret identifiers is the use of biometric devices.

Biometric devices include devices that read, for example, fingerprints, retinas, or in some instances, detect voice characteristics. Biometric devices are advantageous for several reasons. Each of the above examples can detect traits that are unique to each individual, and which are largely impossible to forge. No memorization is required by the user to provide this "unique code". Further this "unique code" required to access the desired information is, for the most part, inseparable from the user, and hence is always available to the user when needed.

Fingerprint scanners have become one of the more common, commercially available biometric security devices. They operate on the principle that every person has fingerprint pattern that is unique to each person. The characteristics of these patterns may be compared to a previously-stored set of characteristics and, if a correlation exists, access is granted to the user.

The optical fingerprint verification scheme calls for the user to press the desired digit against a transparent surface. A scanner on the other side of the surface takes one or more pictures of the fingerprint pattern. The pattern is processed to identify its characteristics, and the characteristic are then compared to the previously-stored set of characteristics to determine if a match exists. Systems that implement this scheme are fairly inexpensive to mass-produce, and they are fairly robust at dealing with issues such as variable placement, orientation, pressure deformation, etc. Nevertheless, they do suffer some potential weaknesses.

As with other biological characteristics, fingerprints in theory are very difficult to forge. As a practical matter, however, living people inevitably acquire a buildup of oils and residue on their skin. As objects are touched by fingers, some of this buildup is transferred from the ridges in our fingerprint patterns to the touched object, producing an image of the fingerprint pattern which is normally invisible. In the course of everyday life, people leave behind latent fingerprint images. If a person can lift one of these latent fingerprints, or recreate a valid fingerprint image from the latent image, and present it to the fingerprint recognition device, the device may recognize it and take a positive action. Just by using the systems as they were meant to be used, the user will normally leave a latent image of his fingerprint pattern on the transparent scanning surface.

One postulated method of attack on these systems involves lightly dusting the transparent surface with a fine powder. The fine powder will adhere to the oils left behind, but be easily removed from any areas where the oils are absent. When illuminated by an external light source, the latent image becomes visible to the scanner. Since the pattern was created by the original fingerprint, the identified characteristics will match those on file, and access will be granted in the absence of any countermeasures. One solution to this type of attack requires users to carry a portable fingerprint platen that is to be placed onto the fingerprint scanner before use. Users then place their fingers on this portable platen. Once access is granted, the user removes the platen and keeps it and any latent fingerprint images with them. While this solution certainly reduces the danger of latent image access, it counteracts at least one of the advantages that fingerprint authorization seeks to offer. That is, it requires users to remember to carry the portable platen at all times.

In situations where portable platens are not a viable option or are not desired, countermeasures must be included in the verification method that will detect latent fingerprint image attacks. It has been recognized that scanners can distinguish real fingerprint patterns from latent or duplicate fingerprint patterns by capturing and comparing multiple images. A typical optical fingerprint scanner consists of a charge-coupled device (CCD) camera and an internal light source. The internal light will illuminate the fingerprint and the carmera will capture the reflected image. A typical frame capture rate is on the order of about several dozen times per second. By comparing successive live images or groups of successive images, the scanner can determine if the image is changing. This countermeasure technique is effective because a live fingerprint image is constantly varying slightly due to changing pressure and motion caused by the user. On the other hand, a latent image remains constant because the latent image on the scanner surface is unchanged. Denying access for a static image thus stymies this attack.

However, it has been discovered that this countermeasure technique can be defeated if this postulated method of attack is augmented. If a strobe light is used to illuminate the static, latent fingerprint image, the scanner can be induced to perceive differences between successive images. These image differences may be sufficient for the latent fingerprint image to be perceived as a real finger, and access may be improvidently granted. It is desirable, therefore, to provide a verification method with improved resistance to latent fingerprint image attacks.

BRIEF SUMMARY OF THE INVENTION

The problems noted above are solved in large part by a fingerprint verification method incorporating band detection. In one embodiment, the method includes capturing a fingerprint image and processing the image to determine if it includes bands attributable to changes in illumination intensity or some other attack during image capture. If such bands are detected, the method preferably aborts the creation of a fingerprint template. Otherwise, if this and other security screens are passed, the method preferably includes the creation, of a fingerprint template which may be compared to a stored fingerprint template to verify user identity. If such verification is established, the user is granted access privileges. One embodiment of a system implementing this method includes a fingerprint scanner for capturing fingerprint images, and an interface card having a digital signal processor (DSP) or other suitable electronics for processing the fingerprint images and generating a fingerprint template representative of the images. The system may further include a general purpose computer coupled to the interface and configured to receive the fingerprint template. The general purpose computer can then use the fingerprint template to verify the identity of the user.

The improved recognition algorithm may advantageously preserve the convenience offered by a fingerprint scanning device while maintaining security and user confidence. The recognition algorithm will also be adaptable to other biometric devices where latent images are a concern and is not limited to fingerprints scanners.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
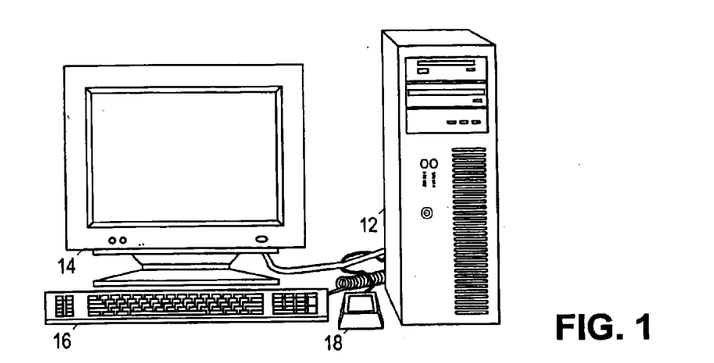
FIG. 1 shows a computer system having a biometric device.

Turning now to the figures, FIG. 1 shows an exemplary computer system in accordance with the preferred embodiment. The computer system of FIG. 1 includes a computer 12, a monitor 14, a keyboard 16, and a biometric device 18. Biometric device 18 is preferably a fingerprint scanner, but other biometric devices may also be employed. Although these components are shown separately here, they may be combined into one package such as, e.g. a laptop computer. The monitor 14, keyboard 16, and biometric device 18 are peripherals through which the user interacts with computer 12. As the computer 12 executes various software tasks, the user may be prompted via monitor 14 to take various actions such as entering a login command via keyboard 16 and pressing a finger against the window on biometric device 18. The tasks executed by the computer 12 preferably include verifying the user's fingerprint and granting access to secured privileges.

Figure 2:
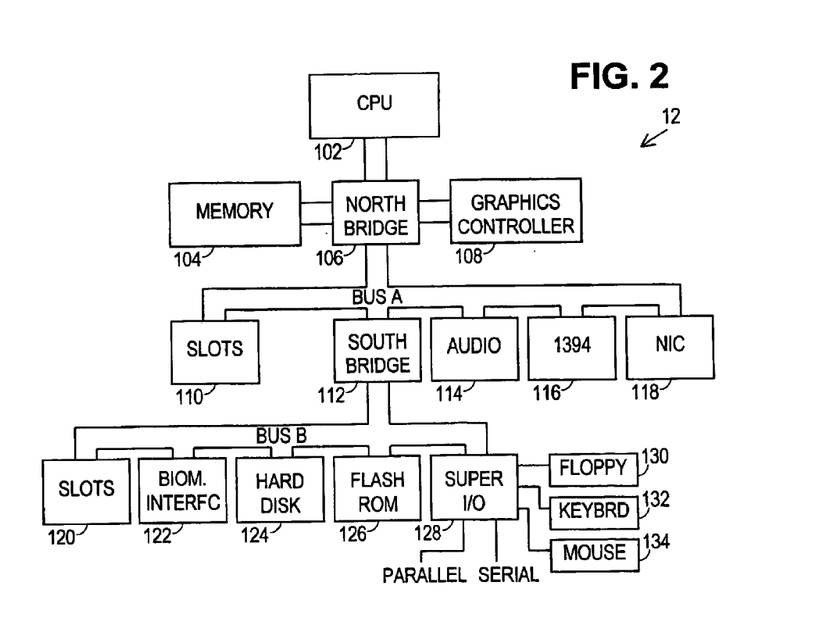
FIG. 2 is a block diagram of the computer system in FIG. 1.

FIG. 2 shows a block diagram of the exemplary computer system of FIG. 1. The computer system includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an accelerated graphics port (AGP) bus. The graphics controller 108 typically provides the video signal that drives monitor 14. The North bridge 106 couples CPU 102, memory 104, and graphics controller 108 to the other peripheral devices in the system through a primary expansion bus (BUS A) such as a PCI bus or an EISA bus. Various components that comply with the bus protocol of BUS A may reside on this bus, such as an audio device 114, a IEEE 1394 interface device 116, and a network interface card (NIC) 118. These components may be integrated onto the motherboard, as suggested by FIG. 2, or they may be plugged into expansion slots 110 that are connected to BUS A., If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location vis-a-vis the North bridge 106 in a typical computer system drawing. An example of such bridge logic is described in U.S. Pat. No. 5,634,073, assigned to Compaq Computer Corporation. Various components that comply with the bus protocol of BUS B may reside on this bus, such as biometric device interface 122, hard disk controller 124, Flash ROM 126, and Super I/O controller 128. Additional slots 120 may also be provided for plug-in components that comply with the protocol of BUS B. The Super I/O controller 128 typically interfaces to basic input/output devices such as a keyboard 132, a mouse 134, a floppy disk drive 130, a parallel port, a serial port, and sometimes various other input switches such as a power switch and a suspend switch.

Figure 3:
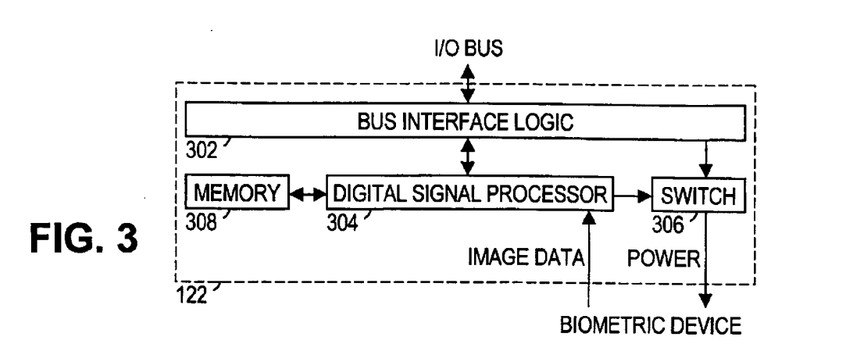
FIG. 3 is a block diagram of an interface card for a biometric device.

The biometric device interface 122 couples to biometric device 18. The biometric device 18 typically includes little more than a window, an internal light source, and a camera The electronics for powering and operating the biometric device 18 are included in the biometric device interface 122. As shown in FIG. 3, the interface 122 may include bus interface logic 302, a digital signal processor (DSP) 304, a power switch 306, and a memory 308. When software executed by CPU 102 initiates an identity verification procedure, the CPU 102 generates a fingerprint acquisition request which is received by the DSP 304 via the bus interface logic 302. The DSP 304 then closes switch 306 to power the biometric device 18 and executes a fingerprint acquisition procedure stored in memory 308. When powered, the biometric device 18 typically begins transmitting scanned image information at a rate of a few dozen frames per second.

Figure 4:
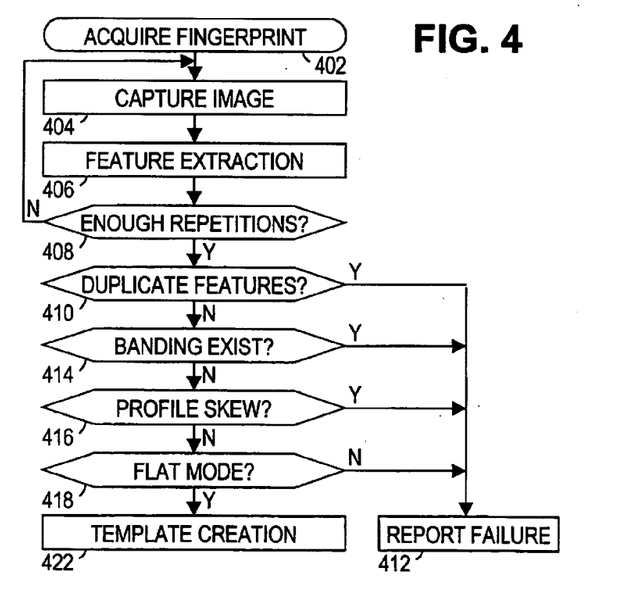
FIG. 4 is a flowchart of a verification method having band detection.

A preferred fingerprint acquisition procedure 402 is given in FIG. 4. Beginning with block 404, the DSP 304 stores an image frame in memory 308. This image is preferably a grayscale image, but otherwise would appear somewhat like FIG. 5. In block 406, the DSP 308 processes the stored image to identify characteristic features of the fingerprint pattern. Among other things, this processing preferably includes the extraction of minutia from the fingerprint pattern.

Figure 6:
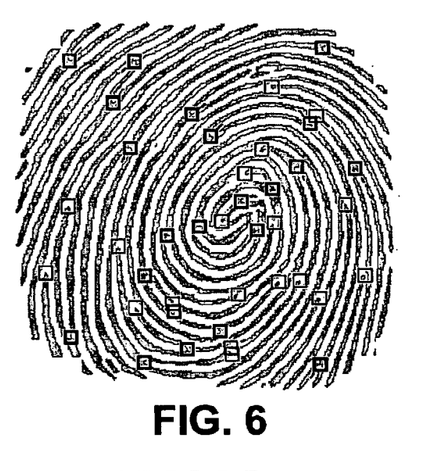
FIG. 6 shows the captured real fingerprint image with minutia information overlaid.

The science of fingerprint identification has recognized that fingerprint patterns can be characterized by features such as ridge line endings and splits. The direction vector of the ridge line as it ends or splits may also be determined to provide greater security. These features are commonly termed "minutia". FIG. 6 shows an example of such extracted minutia, overlaid on the processed fingerprint pattern. The existence and relative positions (i.e. relative angles and relative distances) of these features can be combined to form a "template" that differs from templates created from any other fingerprint patterns. More than one template may result from a given fingerprint pattern, but they correlate well with each other, and very poorly with templates from different fingerprint patterns. These templates offer other advantages, including greatly reduced storage requirements and the virtual impossibility of "reverse-engineering" a fingerprint that will correspond to the template.

Returning to FIG. 4, the DSP preferably captures a subsequent image frame in block 404 and repeats the feature extraction in block 406, repeating these steps until enough repetitions have been performed as decided in block 408. Then in block 410, the DSP compares the extracted features to determine if the series of image frames are duplicates. Because a real finger is expected to exhibit at least some minimal amount of variation across a series of frames, the detection of less than this amount of variation causes the DSP to abort the acquisition process and report failure in block 412. Otherwise, in block 414 the DSP checks for banding of one or more of the images.

Figure 7:
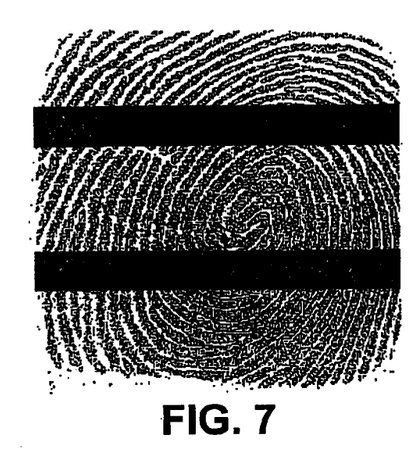
FIG. 7 shows a captured latent fingerprint image when illuminated by a strobe light.

Image banding is an indication of a latent-image strobe attack. The biometric device 18 typically scans and transmits images in a raster-fashion, i.e. one pixel row at a time in column order, with the rows transmitted in row order. If a latent image is dusted and illuminated with a strobe light at an appropriate frequency, the alternating illumination and non-illumination of the latent image will manifest as bands in the fingerprint image. Examples of appropriate frequencies may include those frequencies approximating the frame rate, or some integer multiple thereof (See, for example, FIG. 7), and those frequencies approximating the row scan rate, or some integer multiple thereof. Those pixels that are scanned while the strobe light is out will be dark with poor contrast. Those pixel rows that are scanned while the strobe light is illuminated will be much lighter with a generally improved image contrast. Unless the strobe light is exactly synchronized with the frame rate, the bands will appear in different locations in subsequent frames. It is noted that the number and width of the bands may be independently varied by adjusting the frequency and duty cycle of the strobe light, and that similar effects may be obtained.

It is noted that image banding may also be an indication of other attack modes. For example, it is conceivable that some CCD cameras might be susceptible to induction (magnetic field) or electrical field attacks that induce similar banding effects to that of the latent-image strobe attack.

Figure 8:
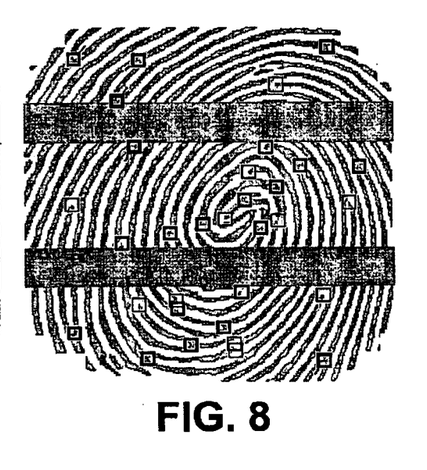
FIG. 8 shows the captured latent fingerprint image with minutia information overlaid.

FIG. 8 shows the extracted minutia for the banded image. Note that some of the original minutia points were not identified in the areas obscured by the bands. As the bands move progressively in the series of frames, different minutia points will be "lost". This causes the extracted features to vary across the series of frames, allowing a latent image to defeat the duplication test of block 410.

Figure 5:
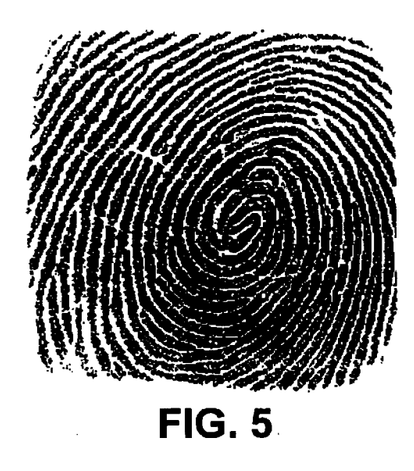
FIG. 5 shows a captured fingerprint image.
Figure 9:
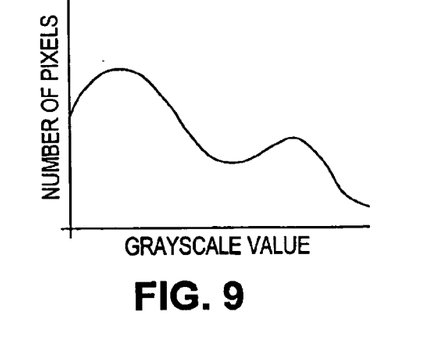
FIG. 9 is an exemplary histogram of grayscale values in a row of a real fingerprint image.
Figure 10:
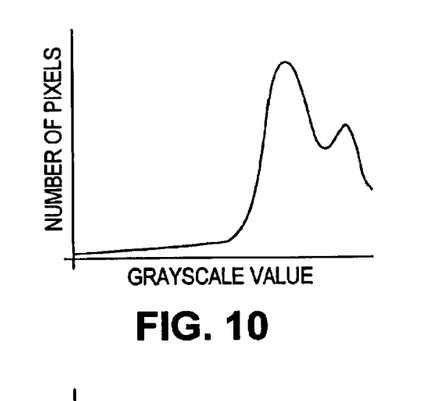
FIG. 10 is an exemplary histogram of grayscale values in a row of a latent fingerprint image when illuminated by an external light source.
Figure 11:
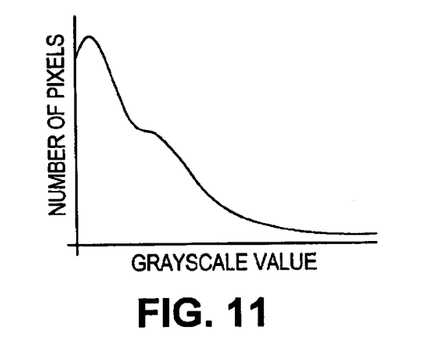
FIG. 11 is an exemplary histogram of grayscale values in a row of a latent fingerprint image when not illuminated by an external light source.

To detect image banding in block 414, some image analysis is needed. FIG. 9 shows an exemplary histogram of pixel values along one scanning row for a real fingerprint image (FIG. 5). Note that there are two well-defined peaks, with the larger peak representing the dark pixels and. the smaller peak representing the light pixels. During periods of latent image illumination, the histogram changes to resemble that of FIG. 10. Two peaks are generally still visible, but the histogram has been skewed towards the light end. During periods when the strobe light is out, the histogram resembles that of FIG. 11. Nearly all the pixels are dark, and contrast is nearly nonexistent.

Figure 12:
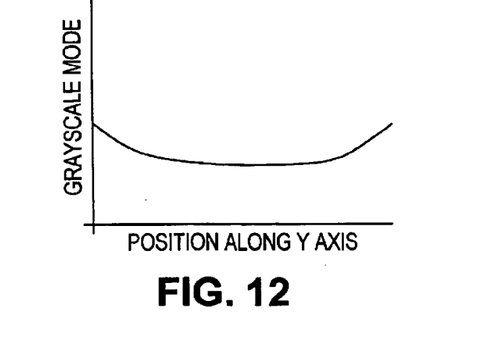
FIG. 12 is an exemplary graph of the mode of the grayscale value histogram as a function of position along the Y-axis, for a real fingerprint.
Figure 13:
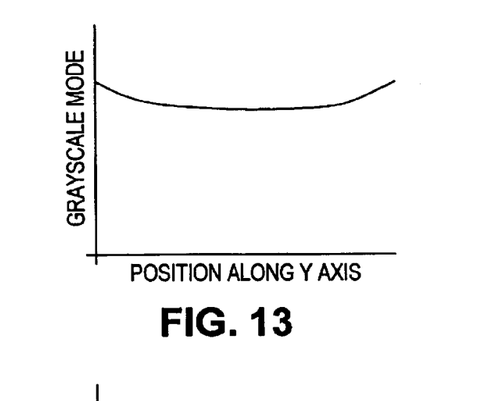
FIG. 13 is an exemplary graph of the grayscale value histogram mode as a function of Y-axis position for a latent image illuminated by a steady external light source.
Figure 14:
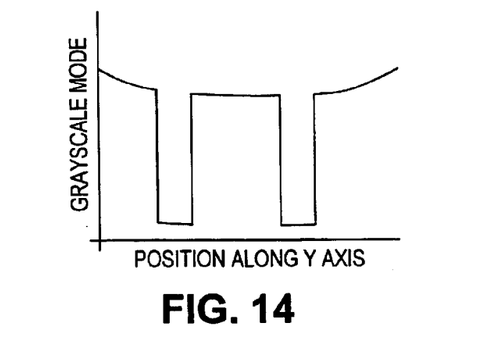
FIG. 14 is an exemplary graph of the grayscale value histogram mode as a function of Y-axis position for a latent image illuminated by a strobe light.

The mode:(highest peak) of the pixel row histogram can be used as an indication of the illumination level. FIGS. 12–14 show the resulting relationship when this mode is plotted as a function of the row position. FIG. 12 shows the expected relationship for a real finger. Note that the illumination level is relatively constant across the bulk of the finger, with some slight increase near the edges of the image. FIG. 13 shows the expected relationship for a latent image illuminated by a constant light source. The illumination level is generally higher and flatter than for a real finger. FIG. 14 shows the expected relationship for a latent image illuminated by a strobe light. The illumination level resembles that of FIG. 13, but drops dramatically in the banded regions.

In block 414, various techniques may be used to detect image banding. In the preferred embodiment, the DSP determines if excessive sudden variations in the grayscale mode exist. In another embodiment, the DSP tests for straight lines a cross the image having at least a predetermined width (e.g. two pixels). If bands are detected, the DSP aborts the acquisition process and reports failure in block 412. Otherwise, the DSP continues with the acquisition process, preferably performing additional tests such as a test for profile skew in block 416 and a test to see if the grayscale mode is relatively flat in block 418. These tests may each be performed on one or more captured images. Once the security screens have been satisfied, the extracted features are used to create a template in block 422. The DSP provides the template, encoded if desired, to the CPU. The CPU may then compare the template to a stored template, or may encode it and transmit it over a network for verification at some central facility. Once the CPU determines that a match exists, the CPU can then grant the user access. Note that for logging into a network, the template, encoded if desired, may be transmitted to a network login server which does the template comparison and grants access if a match is detected.

It is noted that the flowchart of FIG. 4 is for illustrative purposes only, and that the actual method used to provide security against latent image attacks may vary considerably from that discussed. Nevertheless, one of ordinary skill in the art will appreciate from this disclosure the utility of detecting bands and various methods by which this detection may be accomplished. This disclosure is not intended to exclude such methods.

It is noted that the disclosed methods may, for example, be implemented in application specific hardware, or alternatively, software executing on a DSP or general purpose CPU. It is not intended to limit the implementation to the specific embodiment described above.

The above discussion is meant to be illustrative of the principles and various embodiments of the present invention. Numerous variations and modifications will become apparent to those skilled in the art once the above disclosure is fully appreciated. Testing for the existence of bands in the image may be performed in a wide variety of ways. For example, bands may be determined to exist only if the position of the excessive mode variances change position from frame to frame. This might prevent an artifact such as a scar from triggering a false detection of a band. Spatial Fourier transforms may be performed to determine changes in spectral properties that might indicate the presence of bands. It is intended that the following claims be interpreted to embrace these and other band detection methods and variations and modifications thereof.

What is claimed is:

1. A computer system, comprising:
   a biometric device configured to transmit images;
   an interface coupled to the device to receive the transmitted images, wherein the interface is configured to device the transmitted images and determine if the subsequent images include bands that differ positionally.

2. The computers of claim 1, wherein the interface is configured to report failure if the interface determines that subsequent images include bands that differ positionally.

3. The computer system of claim 1, wherein the bands are attributable to illumination changes.

4. The computer system of claim 1, wherein the bands are attributable to electrical changes.

5. The computer system of claim 1, wherein the bands are attributable to induction across the biometric device.

6. The computer system of claim 1, wherein the interface is configured to process the images to determine minutia information.

7. The computer system of claim 6, wherein the interface is configured to convert the minutia information into a template only if the interface does not determine that the transmitted images include said bands.

8. The computer system of claim 1, wherein the biometric device is a fingerprint scanner configured to transmit images of fingerprints.

9. The computer system of claim 1, wherein the interface determines if one or more of the transmitted images include at least one straight line having at least a predetermined width across the image.

10. The computer system of claim 1, wherein the interface processes a plurality of rows to determine a corresponding plurality of grayscale value histograms.

11. The computer system of claim 10, wherein the interface processes the plurality of grayscale value histograms to determine a corresponding plurality of modes for the grayscale value histograms.

12. The computer system of claim 11, wherein the interface determines if the plurality of modes indicate the existence of bands in the images by determining if the modes exhibit variations greater than a predetermined amount.

13. The computer system of claim 1, wherein the interface connects to an expansion slot, and wherein the computer system further comprises:
   a system memory configured to store software;
   a processor coupled to the system memory and configured to execute the software wherein the processor is further coupled to the interface, wherein the software configures the processor to initiate operation of the interface and biometric device.

14. The computer system of claim 13, wherein the processor is configured to receive a template from the interface, and wherein the processor is configured to compare the template to a stored template.

15. The computer system of claim 13, wherein the computer system further comprises:
   a network interface coupled to a network login server, wherein the network login server is configured to receive a template from the interface, and wherein the network login server is configured to compare the template to a stored template.

16. A fingerprint verification method that comprises:
   capturing a sequence of fingerprint images;
   comparing the fingerprint images; and
   determining if the fingerprint Images include bands having different positions.

17. The method of claim 16, wherein said bands are bands attributable to illumination changes.

18. The method of claim 16, wherein the determining is one of a plurality of security tests, and wherein the method further comprises:
   creating a fingerprint template if the image passes the plurality of security tests.

19. The method of claim 18, wherein the creating includes:
   extracting minutia information from the fingerprint image; and
   converting the minutia information into the fingerprint template.

20. The method of claim 19, wherein the plurality of security tests includes:
   determining if minutia information from one fingerprint image matches minutia information from another fingerprint image.

21. The method of claim 16, wherein the capturing includes:
   illuminating a window from a scanning side;
   scanning light reflected back through the window in raster fashion.

22. The method of claim 16, wherein the determining includes:
   detecting at least one straight line spanning the image and having at least a predetermined width.

23. The method of claim 16, wherein the determining includes:
   finding a grayscale value histogram mode for each row of the fingerprint image;
   calculating a variance of the modes; and determining that the fingerprint image includes bands if the variance exceeds a predetermined threshold.

24. The method of claim 18, wherein the plurality of tests includes: and extracting minutia information from a plurality of fingerprint images;

comparing the minutia information of the plurality of images to determine if at least a minimum amount of variation exists, and if not, aborting the creation of the fingerprint match template.

25. A fingerprint verification system that comprises:

a capture means for capturing fingerprint images; and a processing means for comparing sequential fingerprint images and for determining if the sequential fingerprint images include non-stationary bands attributable to condition changes during the capturing of the fingerprint images.

26. The system of claim 25, wherein said condition changes include illumination intensity changes.

27. The system of claim 25, wherein if the processing means determines that the fingerprint images include non-stationary bonds, the processing means prevents creation of a fingerprint template from information in the fingerprint images.

28. A system, comprising:

a camera; and a digital signal processor (DSP) coupled to the camera, wherein the DSP is configured to capture a plurality of image frames from the camera and detect if a series of the plurality of image frames are duplicate image frames and wherein the DSP is further configured to determine a most common grayscale value of pixels for each pixel line of each image frame and detect when different pixel lines in two or more subsequent image frames have a most common grayscale value below a predetermined threshold.

29. The system of claim 28 wherein to plurality of image frames comprise fingerprint images.

30. The system of claim 28 wherein the duplicate image frames exhibit less than a threshold amount of variation across the series of the plurality of image frames.

31. The system of claim 28 wherein the DSP performs an action upon detecting duplicate image frames.

32. The system of claim 31 wherein the action comprises at least one action selected from the group consisting of aborting an image frame acquisition process and reporting a failure.

33. The system of claim 28 wherein pixel lines that have a most common garyscale value below a predetermined threshold comprise banded regions and wherein the banded regions are attributable to condition changes during capture of the successive image frames by the camera.

34. The system of claim 33 wherein the DSP detects banded regions in an image frame by detecting if more than a predetermined amount of grayscale variation exists.

35. The system of claim 33 wherein the DSP detects banded regions in an image frame by detecting lines across the image frame, wherein the lines have at least a predetermined width.

36. The system of claim 33 wherein the DSP performs an action if a banded region is detected.

37. The system of claim 36 wherein the action comprises at least one action selected from the group consisting of aborting an image frame acquisition process and reporting a failure.

38. A system, comprising:

a biometric device comprising a scanner that scans a series of images at a predetermined rate; and a processor coupled to the biometric device;

wherein the processor is configured to compare subsequent images and determine if the subsequent images have greater than a predetermined amount of pattern changes; and wherein, if the subsequent images have greater than a threshold amount of pattern changes, the processor determines a most common grayscale pixel value for each pixel line to detect if image banding exists wherein the image banding is attributable to condition changes during a scanning process of each image.

39. The system of claim 38 wherein if the processor does not determine that the subsequent images have greater than a predetermined amount of pattern changes, the processor asserts a signal indicating that a problem exists.

40. The system of claim 38 wherein if the processor detects image banding, the processor asserts a signal indicating that a problem exists.

* * * * *

UNITED STATES PATENT AND TRADEMARK OFFICE
CERTIFICATE OF CORRECTION

PATENT NO. : 6,952,489 B1  
APPLICATION NO. : 09/675530  
DATED : October 4, 2005  
INVENTOR(S) : Michael F. Angelo et al.

Page 1 of 1

It is certified that error appears in the above-identified patent and that said Letters Patent is hereby corrected as shown below:

In column 10, line 6, in Claim 33, delete "garyscale" and insert -- grayscale --, therefor.

Signed and Sealed this

Eleventh Day of August, 2009

David J. Kappos  
*Director of the United States Patent and Trademark Office*